US009615632B2

(12) United States Patent
Okano et al.

(10) Patent No.: US 9,615,632 B2
(45) Date of Patent: Apr. 11, 2017

(54) TONGUE AND SEAT BELT DEVICE USING SAME

(71) Applicant: Takata Corporation, Tokyo (JP)

(72) Inventors: Motonori Okano, Tokyo (JP); Yuuki Tabata, Tokyo (JP); Yoshihiko Kawai, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 66 days.

(21) Appl. No.: 14/415,264

(22) PCT Filed: Jul. 16, 2013

(86) PCT No.: PCT/JP2013/069299
§ 371 (c)(1),
(2) Date: Jan. 16, 2015

(87) PCT Pub. No.: WO2014/013987
PCT Pub. Date: Jan. 23, 2014

(65) Prior Publication Data
US 2015/0173461 A1    Jun. 25, 2015

(30) Foreign Application Priority Data
Jul. 18, 2012    (JP) .................................. 2012-159694

(51) Int. Cl.
*A44B 11/25*        (2006.01)
*B60R 22/18*        (2006.01)

(52) U.S. Cl.
CPC ...... *A44B 11/2546* (2013.01); *A44B 11/2561* (2013.01); *B60R 22/18* (2013.01); *B60R 2022/1812* (2013.01); *Y10T 24/45241* (2015.01)

(58) Field of Classification Search
CPC . A44B 11/2546; A44B 11/2561; B60R 22/18; B60R 2022/1812; Y10T 24/45241
See application file for complete search history.

(56) References Cited

U.S. PATENT DOCUMENTS 4,550,951 A    11/1985    Apri
4,893,874 A    1/1990    Childress et al.
(Continued)

FOREIGN PATENT DOCUMENTS

EP    0 184 172 A2    6/1986
JP    56-036356    8/1979
(Continued)

OTHER PUBLICATIONS

International Search Report dated Oct. 29, 2013 issued in PCT/JP2013/069299.
(Continued)

*Primary Examiner* — Robert J Sandy
*Assistant Examiner* — Louis Mercado
(74) *Attorney, Agent, or Firm* — Foley & Lardner LLP

(57)    ABSTRACT

To enable a tongue to be more compact in size even when a seat-belt locking member is disposed and to achieve satisfactory mountability. A tongue (7) includes a resin mold portion (12) having seat belt lock guide holes (21) and (22). The resin mold portion (12) is provided with a seat belt lock (13) such that it is movable between an unlocking position where it does not lock a seat belt (4) and a locking position where it locks the seat belt (4) while being guided by the seat belt lock guide holes (21) and (22), and the seat belt lock (13) is set in the unlocking position under normal conditions and is set in the locking position in emergency. The seat belt lock (13) is continuously urged toward the unlocking position by a torsion spring (14). In emergency, the seat belt lock (13) is set in the locking position by a pressing force from
(Continued)

the seat belt (4) against the urging force of the torsion spring (14).

6 Claims, 7 Drawing Sheets

(56) References Cited

U.S. PATENT DOCUMENTS

| | | | |
|---|---|---|---|
| 6,250,684 B1 | 6/2001 | Gleason et al. | |
| 7,325,280 B2 | 2/2008 | Ichida | |
| 8,079,616 B2 * | 12/2011 | Higuchi | B60R 22/4604 24/170 |
| 8,820,788 B2 * | 9/2014 | Goudeau | A44B 11/2561 280/806 |
| 2006/0138852 A1 * | 6/2006 | Ichida | A44B 11/2557 297/483 |
| 2006/0226694 A1 * | 10/2006 | Higuchi | B60R 22/4604 297/480 |
| 2010/0276532 A1 * | 11/2010 | Higuchi | B60R 22/4604 242/396.1 |
| 2012/0286501 A1 * | 11/2012 | Goudeau | A44B 11/2561 280/801.1 |
| 2015/0314749 A1 * | 11/2015 | Moker | A44B 11/2561 297/464 |
| 2015/0367800 A1 * | 12/2015 | Zhang | B60R 22/24 280/733 |

FOREIGN PATENT DOCUMENTS

| | | |
|---|---|---|
| JP | 06-339404 | 12/1994 |
| JP | 07-071522 B2 | 8/1995 |
| JP | 08-080803 A | 3/1996 |
| JP | 2001-010443 | 1/2001 |
| JP | 2006-182103 | 7/2006 |

OTHER PUBLICATIONS

Notice of Rejection issue by Japanese Patent Office on Jan. 6, 2016 in Application No. JP2012-159694.

* cited by examiner

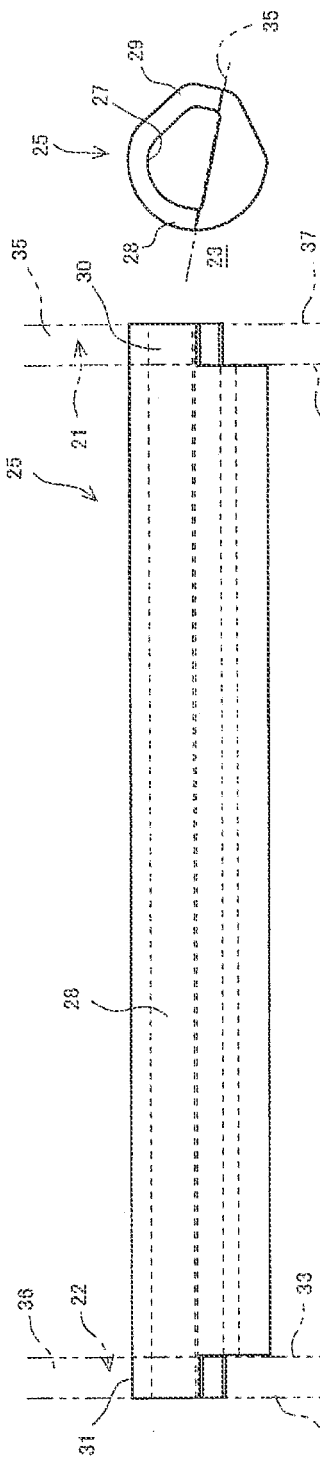
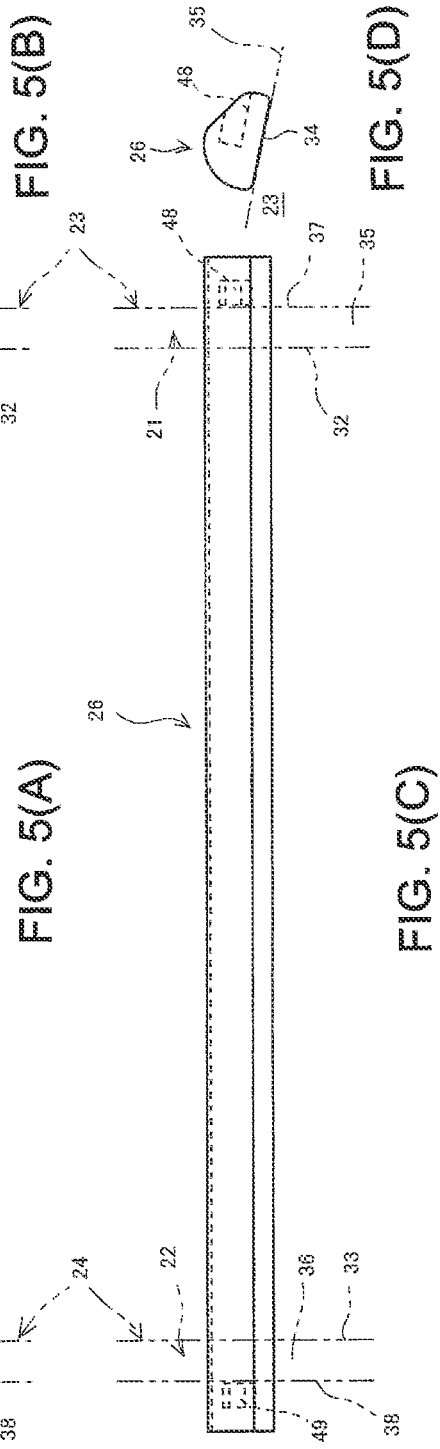
FIG. 5(A)
FIG. 5(B)
FIG. 5(C)
FIG. 5(D)

TONGUE AND SEAT BELT DEVICE USING SAME

TECHNICAL FIELD

The present invention relates to the technical field of a tongue used in a seat belt device, slidably supported on a seat belt, and engageable in a buckle fixed on a vehicle body or the like and of a seat belt device using the same.

BACKGROUND ART

A traditional seat belt device installed on a vehicle seat in an automobile or the like restrains an occupant using the seat belt in an emergency condition where deceleration acts on the vehicle, such as in a collision, (hereinafter referred to simply as in emergency). One typical example of the seat belt device of this type is a three-point seat belt device, which is widely known and frequently used. In such a typical known three-point seat belt device, a seat belt with its leading end fixed on a vehicle body withdrawn from a seat belt retractor is guided toward an occupant by a belt guide. A tongue is slidably supported on the guided seat belt. In this case, the seat belt penetrates through an elongated seat belt insertion hole in the tongue. The seat belt is attached to the occupant by engagement of the tongue into the buckle fixed on the vehicle body.

In a state where the seat belt is attached to the occupant, the seat belt between the belt guide and the tongue functions as a shoulder belt attached to a shoulder and chest of the occupant, and the seat belt between the end fixed on the vehicle body and the tongue functions as a lap belt attached to the lap (waist) of the occupant. In emergency, which is described above, the locking mechanism of the seat belt retractor is activated and impedes withdrawal of the seat belt, and thus the shoulder belt restrains the shoulder and chest of the occupant and the lap belt restrains the waist of the occupant.

In such a seat belt device, typically, even when the locking mechanism of the seat belt retractor is activated in emergency, the inertial force of the occupant causes the lap belt to slightly extend outward. This makes it difficult to effectively restrain the occupant by the seat belt.

A tongue and seat belt device capable of enabling the tongue to smoothly move relative to a seat belt in a normal operation of the tongue and of suppressing outward extension of a lap belt in emergency by locking the seat belt using a locking member provided to the tongue are proposed (see, for example, Patent Literature 1).

In the tongue described in Patent Literature 1, the metal locking member having an elongated shaft shape penetrates through guide holes in a metal tongue body in a longitudinal direction of the guide holes, and the opposite end portions of the locking member are urged by coil springs. In normal operation, the locking member is set in an unlocking position where it does not lock the seat belt. In emergency, the locking member is set in a locking position where it locks the seat belt.

CITATION LIST

Patent Literature

PTL 1: U.S. Pat. No. 4,893,874

SUMMARY OF INVENTION

Technical Problem

In the tongue described in Patent Literature 1, the opposite end portions of the locking member are urged by the two coil springs. Unfortunately, when the opposite end portions of the locking member are urged by the two coil springs, the gripping portion of the tongue inevitably has an increased width. Additionally, because it is necessary to arrange each of the two coil springs such that the extending direction thereof is oriented in the direction of the movement of the locking member, the gripping portion of the tongue also inevitably has an increased length in its longitudinal direction. Thus there is a problem that the size of the tongue is increased correspondingly. Additionally, because it is necessary to mount the two independent coil springs, the tongue does not necessarily achieve satisfactory mountability.

Because the metal locking member slides while being guided by the guide holes in the metal tongue body, there is also a problem that operating noise emits when the locking member moves.

Moreover, in order to enable the locking member to lock the seat belt with stability, it is necessary to have a relatively increased size in the transverse sectional shape of the seat-belt locking member, which is composed of a single member. Thus when the opposite end portions of the seat-belt locking member penetrates through the guide holes, each of the guide holes inevitably has an increased width, and this leads to an increased size in the tongue. In addition, when the size of the tongue is large, mounting the seat-belt locking member into the guide holes is complicated, and the tongue does not necessarily achieve satisfactory mountability.

In view of the aforementioned circumstances, it is an object of the present invention to provide a tongue capable of being more compact in size even when a locking member is disposed and of achieving satisfactory mountability and to provide a seat belt device using the same.

It is another object of the present invention to provide a tongue capable of being more compact in size, of effectively reducing the emission of operating noise, and of achieving satisfactory mountability and to provide a seat belt device using the same.

Solution to Problem

To solve the aforementioned problems, the tongue according to the present invention is slidably supported on a seat belt and is engageable in a buckle. The tongue includes a tongue body, a resin mold portion, a seat-belt locking member, and a torsion spring. The tongue body includes a gripping base and an engagement portion. The gripping base has a guide hole. The engagement portion is engageable in the buckle. The resin mold portion is on the gripping base in the tongue body. The seat-belt locking member around which the seat belt is wound is movable between an unlocking position where the seat-belt locking member does not lock the seat belt and a locking position where the seat-belt locking member locks the seat belt while being guided by the guide hole. The seat-belt locking member is set in the unlocking position under normal conditions and is set in the locking position in emergency. The torsion spring is configured to continuously urge the seat-belt locking member to the unlocking position. In the emergency, the seat-belt locking member is set in the locking position by a pressing force from the seat belt.

In the tongue according to the present invention, the torsion spring may include a single wire having springiness.

Moreover, in the tongue according to the present invention, the torsion spring may include at least a torsion portion and a pair of locking-member connection portions. The torsion portion may be made of one turn of the wire and be torsionally deformable. The pair of locking-member connection portions may be connected to opposite end portions of the seat-belt locking member, respectively.

Moreover, in the tongue according to the present invention, the guide hole may have a guide surface allowing the seat-belt locking member to slide thereon. At least the guide surface may be made of resin.

Moreover, the tongue according to the present invention is slidably supported on a seat belt and is engageable in a buckle. The tongue includes a tongue body, a resin mold portion, a seat-belt locking member, and a torsion spring. The tongue body includes a gripping base and an engagement portion. The gripping base has a guide hole. The engagement portion is engageable in the buckle. The resin mold portion is on the gripping base in the tongue body. The seat-belt locking member around which the seat belt is wound is movable between an unlocking position where the seat-belt locking member does not lock the seat belt and a locking position where the seat-belt locking member locks the seat belt while being guided by the guide hole. The seat-belt locking member is set in the unlocking position under normal conditions and is set in the locking position in emergency. The torsion spring is configured to continuously urge the seat-belt locking member to the unlocking position. The seat-belt locking member includes a tubular locking member around which the seat belt is wound and a locking-member supporting shaft member. The locking member is configured to lock the seat belt. The locking-member supporting shaft member penetrates through an inner hole of the locking member, supports the locking member while disabling relative rotation thereof, and penetrates through the guide hole. The locking-member supporting shaft member is urged by the torsion spring. In the emergency, the locking member is set in the locking position by a pressing force from the seat belt.

Moreover, the tongue according to the present invention is slidably supported on a seat belt and is engageable in a buckle. The tongue includes a tongue body, a resin mold portion, a seat-belt locking member, and a torsion spring. The tongue body includes a gripping base and an engagement portion. The gripping base has a guide hole. The engagement portion is engageable in the buckle. The resin mold portion is on the gripping base in the tongue body. The seat-belt locking member around which the seat belt is wound is movable between an unlocking position where the seat-belt locking member does not lock the seat belt and a locking position where the seat-belt locking member locks the seat belt while being guided by the guide hole. The seat-belt locking member is set in the unlocking position under normal conditions and is set in the locking position in emergency. The torsion spring is configured to continuously urge the seat-belt locking member to the unlocking position. The seat-belt locking member includes a tubular locking member around which the seat belt is wound and a locking-member supporting shaft member. The locking member is configured to lock the seat belt. The locking-member supporting shaft member penetrates through an inner hole of the locking member, supports the locking member while disabling relative rotation thereof, and penetrates through the guide hole. The locking member includes a seat-belt pinching reduction portion configured to reduce a possibility that the seat belt is pinched. The locking-member supporting shaft member is urged by the torsion spring. In the emergency, the seat-belt locking member is set in the locking position by a pressing force from the seat belt.

A seat belt device according to the present invention includes at least a seat belt, a seat belt retractor configured to retract the seat belt, a tongue slidably supported on the seat belt, and a buckle allowing the tongue to be engaged therein. The seat belt device is attached to an occupant by engagement of the tongue into the buckle. The tongue is any one of the tongues according to the present invention described above.

Advantageous Effects of Invention

In the tongue and seat belt device configured as described above according to the present invention, the torsion spring having springiness and made of a wire with a relatively small diameter is used in a lock urging member configured to urge the seat-belt locking member. The thickness of the torsion spring is smaller than that of a traditionally used coil spring. This enables the thickness of the gripping portion of the tongue to be reduced very effectively, in comparison with that in traditional cases.

A wire is simply arranged in the urging section achieved by the torsion spring in the seat-belt locking member. This enables the space where the torsion spring is arranged in the width direction of the gripping portion of the tongue to be thinner than that in the case of coil springs. Accordingly, the width of the gripping portion of the tongue can be reduced very effectively, in comparison with that in traditional cases where coil springs are used.

Moreover, the use of the torsion spring can reduce the space where the torsion spring is placed in the direction of movement of the seat-belt locking member in the urging section in the seat-belt locking member achieved by the torsion spring, in comparison with that in traditional cases where coil springs are used. Accordingly, the length of the tongue in the longitudinal direction (longitudinal direction of the engagement portion) can be effectively reduced, in comparison with traditional cases where coil springs are used.

Even when the seat-belt locking member is disposed, the tongue can be compact in size. This can improve the ease of handling of the tongue by an occupant and achieve satisfactory ease of attaching the seat belt.

Moreover, the use of the single torsion spring reduces the number of parts, in comparison with traditional cases where two coil springs are used. Thus the mountability of the tongue can be more improved.

Moreover, the seat-belt locking member includes two members consisting of the locking member and the locking-member supporting shaft member. Only the shape of the locking-member supporting shaft member as seen from the side (transverse sectional shape) can be reduced, and when the opposite end portions of the locking-member supporting shaft member penetrate through the guide holes, the width of each of the guide holes can be reduced. Accordingly, the tongue can be more compact. Additionally, the shape of the locking member as seen from the side (transverse sectional shape) can be relatively large, and the locking member can lock the seat belt with stability.

Moreover, when the seat-belt locking member moves, the locking-member supporting shaft member slides on the resin-molded inner peripheral surfaces of the guide holes. Thus emission of operating noise when the locking-member supporting shaft member moves can be suppressed.

Moreover, the locking member includes the seat-belt pinching reduction portion. Thus the possibility that the seat belt is pinched between the opposite ends of the locking member and the side walls of the tongue body can be reduced.

BRIEF DESCRIPTION OF DRAWINGS

FIG. 5(A) is a front view that illustrates a locking member, FIG. 5(B) is a right side view in FIG. 5(A), FIG. 5(C) is a front view that illustrates a locking-member supporting shaft member, and FIG. 5(D) is a right side view in FIG. 5(C).

DESCRIPTION OF EMBODIMENTS

Embodiments for carrying out the present invention are described below with reference to the drawings.

Figure 1:
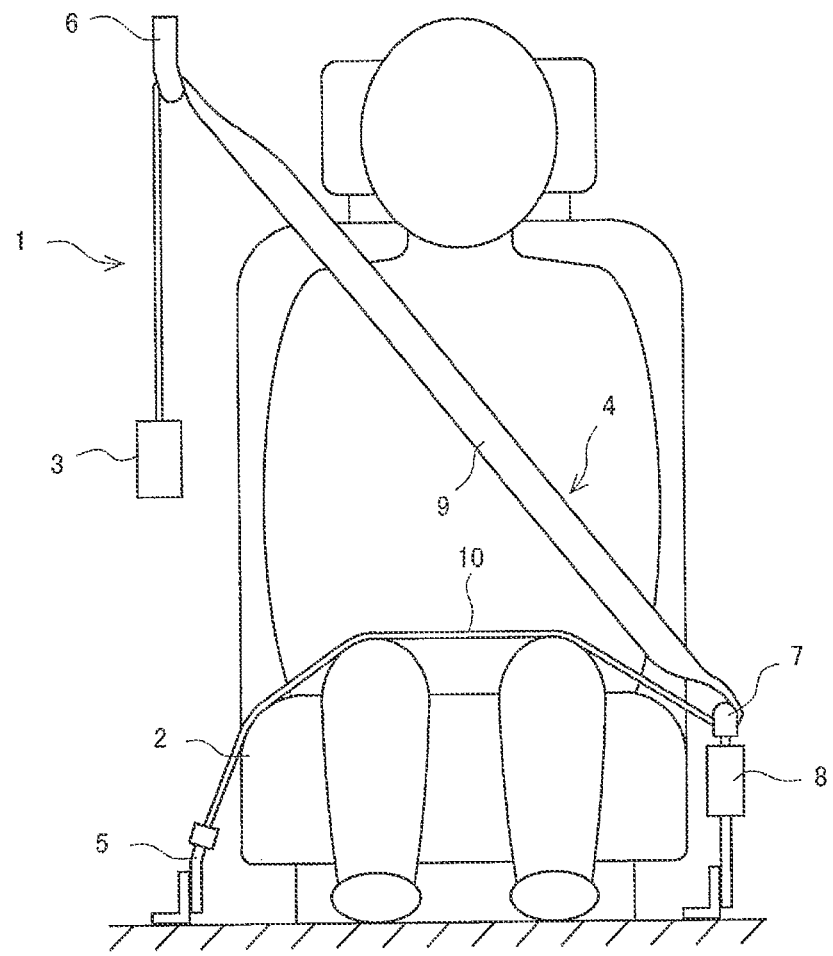
FIG. 1 schematically illustrates one example of an embodiment of a seat belt device according to the present invention.

FIG. 1 schematically illustrates one example of an embodiment of a seat belt device according to the present invention. As illustrated in FIG. 1, the seat belt device in this example is basically the same as a publicly known three-point seat belt device. Referring to FIG. 1, numeral 1 indicates the seat belt device, numeral 2 indicates a vehicle seat, numeral 3 indicates a seat belt retractor arranged in the vehicle body adjacent to the vehicle seat 2, numeral 4 indicates a seat belt retractable by the seat belt retractor 3 in a withdrawable manner and including a belt anchor 5 at the leading end fixed on the floor of the vehicle body or the vehicle seat 2, numeral 6 indicates a belt guide anchor configured to guide the seat belt 4 withdrawn from the seat belt retractor 3 toward the shoulder of an occupant, numeral 7 indicates a tongue slidably supported on the seat belt 4 guided from the belt guide anchor 6, and numeral 8 indicates a buckle fixed to the floor of the vehicle body or the vehicle seat 2 and permitting the tongue 7 to be inserted and caught therein in an engageable and disengageable manner. The operation of attaching the seat belt 4 and the operation of detaching it in the seat belt device 1 are also the same as in the publicly known seat belt device.

When the seat belt 4 is not attached, the tongue 7 is not engaged in the buckle 8 and the seat belt 4 is retracted by the seat belt retractor 3 by the entire amount (specifically, the amount in which the seat belt retractor 3 can retract the seat belt 4 in a free manner). When the seat belt 4 is attached to an occupant, as illustrated in FIG. 1, the seat belt 4 is withdrawn from the seat belt retractor 3 by a predetermined amount. Then, when the tongue 7 is engaged in the buckle 8 and the flexure of the seat belt 4 is removed, the seat belt 4 is thus attached to the occupant.

In a state where the seat belt 4 is attached to the occupant, under normal conditions where deceleration fairly larger than deceleration applied on the vehicle when the vehicle normally runs is not applied, the seat belt 4 can be freely withdrawn at a normal belt withdrawal speed, and when the hand is moved off the seat belt 4, an excessively withdrawn amount of the seat belt 4 is retracted by the seat belt retractor 3. In that case, the section of the seat belt 4 between the belt guide anchor 6 and the tongue 7 is a shoulder belt 9 configured to restrain the shoulder and chest of the occupant, and the section of the seat belt 4 between the belt anchor 5 and the tongue 7 is a lap belt 10 configured to restrain the waist and legs of the occupant.

In a state where the seat belt 4 is attached, in emergency, the seat belt retractor 3 locks the withdrawal of the seat belt 4 and the seat belt 4 restrains the occupant. Similar to a typical seat belt retractor, the seat belt retractor 3 in this example locks the withdrawal of the seat belt 4 even if the seat belt 4 is withdrawn at a belt withdrawing speed significantly higher than a normal belt withdrawing speed. The seat belt retractor 3 may include a pretensioner and energy absorbing (EA) mechanism, which are not illustrated. The pretensioner and EA mechanism are optional.

Figure 2:
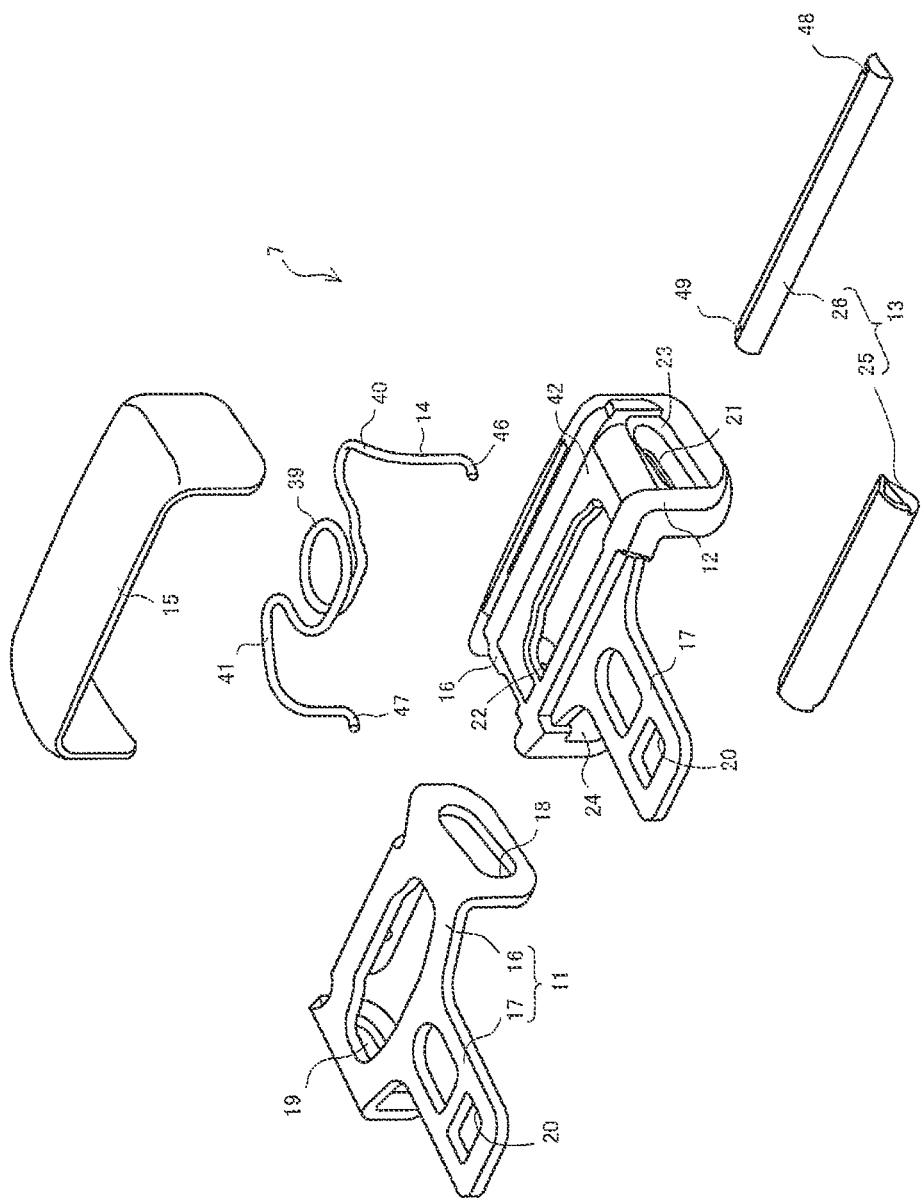
FIG. 2 is an exploded perspective view that illustrates an example of an embodiment of a tongue according to the present invention used in the seat belt device in the example illustrated in FIG. 1.
Figure 3A:
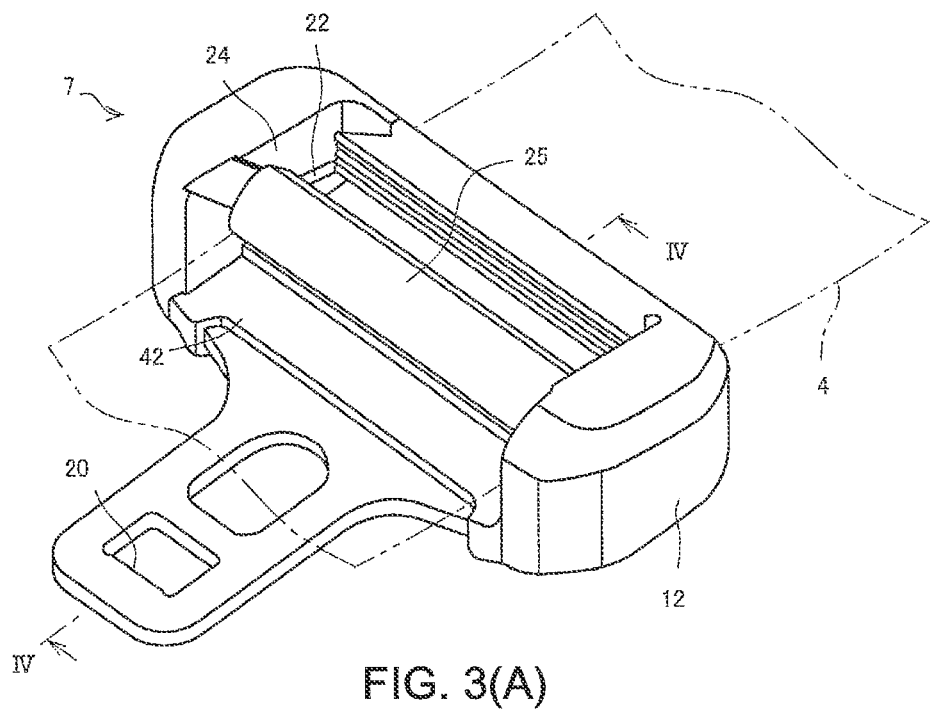
FIG. 3(A) is a perspective view that illustrates the front of the tongue in the example illustrated in FIG. 2.
Figure 3B:
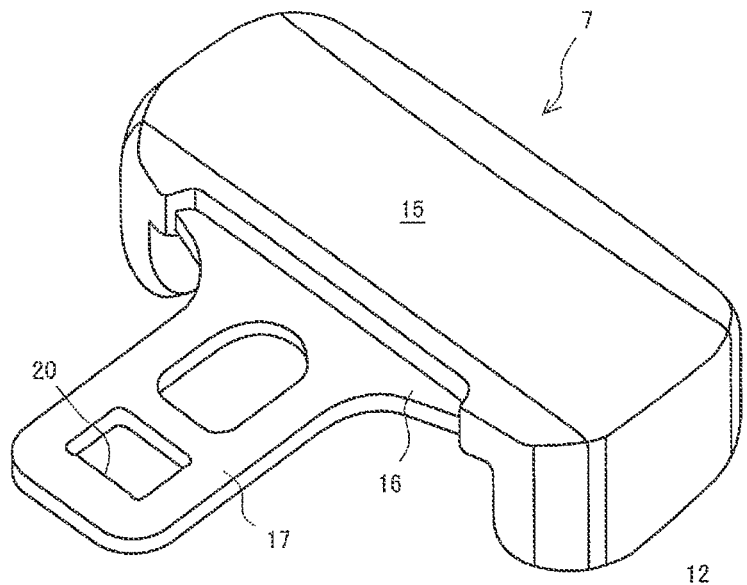
FIG. 3(B) is a perspective view that illustrates the back side of the tongue in this example.

FIG. 2 is an exploded perspective view that illustrates an example of an embodiment of the tongue according to the present invention used in the seat belt device in this example. FIG. 3(A) is a perspective view that illustrates the front of the tongue in the example illustrated in FIG. 2. FIG. 3(B) is a perspective view that illustrates the back side of the tongue in this example.

As illustrated in FIGS. 2, 3(A), and 3(B), the tongue 7 in this example includes a metal tongue body 11, a resin mold portion 12, a seat belt lock 13 being a seat-belt locking member in the present invention, a torsion spring 14, and a resin cover 15.

Figure 4:
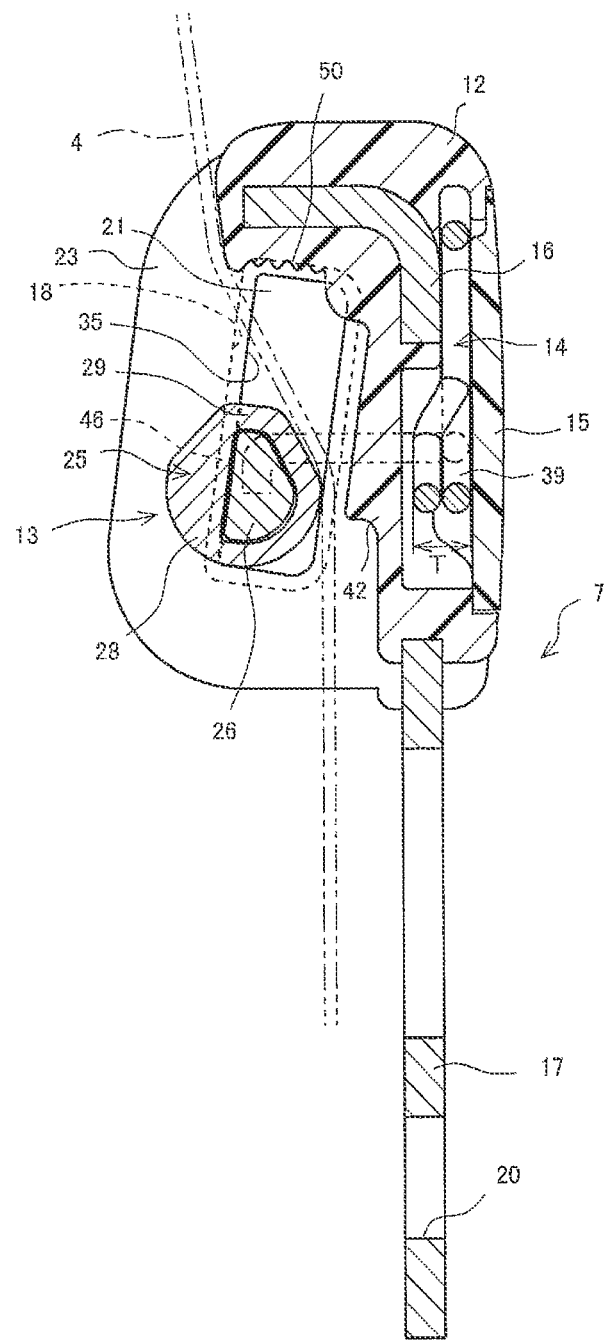
FIG. 4 is a cross-sectional view taken along line IV-IV in FIG. 3(A).

The tongue body 11 includes a gripping base 16 and an engagement portion 17 and has a substantially T shape. The engagement portion 17 can be inserted and engaged in the buckle 8. The gripping base 16 has linear seat belt lock guide base holes 18 and 19 in opposite side walls. The engagement portion 17 has an engagement hole 20 in which a latch member (not illustrated) in the buckle 8 can be engaged. The resin mold portion 12 is formed by resin-molding the gripping base 16 in the tongue body 11. In that case, all of the opposite side walls of the gripping base 16 is resin-molded. Accordingly, all of the inner peripheral surface of each of the seat belt lock guide base holes 18 and 19 is resin-molded, and linearly extending seat belt lock guide holes 21 and 22 are formed. That is, as illustrated in FIG. 2, the resin mold portion 12 has opposite side walls 23 and 24 corresponding to the opposite side walls of the gripping base 16, and the seat belt lock guide holes 21 and 22 are formed in the side walls 23 and 24, respectively. As illustrated in FIGS. 2 and 4, each of the seat belt lock guide holes 21 and 22 is inclined and extends in the longitudinal direction of the engagement portion 17 (direction in which the engagement portion 17 is inserted in the buckle 8). The inclination of each of the seat belt lock guide holes 21 and 22 is the one extending away from the gripping base 16 as it approaches the engagement portion 17.

As illustrated in FIG. 2, the seat belt lock 13 includes two members consisting of a locking member 25 and a locking-member supporting shaft member 26 supporting the locking member 25. As illustrated in FIGS. 4, 5(A), and 5(B), the locking member 25 is composed of an elongated tubular metal member having an axially extending inner hole 27. The outer shape of the locking member 25 as seen from the side includes a substantially semicircular arc portion and a substantially trapezoidal portion. The substantially semicircular arc portion is a seat belt winding portion 28 around which the seat belt 4 is to be wound. The substantially trapezoidal portion is a seat-belt locking portion 29 configured to lock the seat belt 4 and prevent outward extension of the lap belt 10 in emergency.

A substantially half portion of the seat belt winding portion 28 and seat-belt locking portion 29 on a first side is longer than another substantially half portion thereof on a second side in the axial direction. In that case, the opposite end portions of the substantially half portion on the first side are protruding portions 30 and 31 axially protruding beyond the opposite end portions of the substantially half portion on the second side. In a state where the locking member 25 is mounted on the resin mold portion 12, the protruding portions 30 and 31 enter the seat belt lock guide holes 21 and 22, respectively. The opposite ends of the substantially half portions on the second side are positioned between inner side wall surfaces 32 and 33 of the opposite side walls 23 and 24 in the resin mold portion 12 such that substantially no gaps are present between the opposite ends and the inner side wall surfaces 32 and 33. The entry of the protruding portions 30 and 31 into the seat belt lock guide holes 21 and 22 can reduce the possibility that the seat belt 4 wound around the seat belt winding portion 28 is pinched between the opposite ends of the locking member 25 and the inner side wall surfaces 32 and 33 of the opposite side walls 23 and 24. That is, the section of the seat belt winding portion 28 in the protruding portions 30 and 31 is a seat-belt pinching reduction portion.

The inner hole 27 in the locking member 25 is positioned in the substantially half portion of the seat belt winding portion 28 and seat-belt locking portion 29 on the first side in the locking member 25. The shape of the inner hole 27 as seen from the side includes a similar shape substantially geometrically similar to the outer shape of the substantially half portion of the seat belt winding portion 28 and seat-belt locking portion 29 on the first side and a linear shape.

As illustrated in FIGS. 4, 5(C), and 5(D), the locking-member supporting shaft member 26 is composed of an elongated axial metal member. The shape of the locking-member supporting shaft member 26 as seen from the side is a substantially geometrically similar shape slightly smaller than the shape of the inner hole 27 as seen from the side and includes a linear portion 34. This allows the locking-member supporting shaft member 26 to axially penetrate through the inner hole 27 in the locking member 25. In a state where the locking-member supporting shaft member 26 is fit into the inner hole 27, the locking member 25 and the locking-member supporting shaft member 26 are substantially unable to rotate relative to each other. The locking-member supporting shaft member 26 can penetrate through the seat belt lock guide holes 21 and 22. In that case, the width of each of the seat belt lock guide holes 21 and 22 (length perpendicular to the longitudinal direction of the seat belt lock guide holes 21 and 22) is larger than the length in a direction perpendicular to the linear portion 34 in the locking-member supporting shaft member 26 in a range where the locking-member supporting shaft member 26 is unable to rotate about the axial direction and both of the protruding portions 30 and 31 is able to enter the seat belt lock guide holes 21 and 22. Moreover, in the state where the locking-member supporting shaft member 26 penetrates through the seat belt lock guide holes 21 and 22, the linear portion 34 in the locking-member supporting shaft member 26 is in planar contact with guide surfaces of linear guide portions 35 and 36 of the inner peripheral surfaces of the seat belt lock guide holes 21 and 22. The guide surfaces of the guide portions 35 and 36 are made of resin. In the state where the linear portion 34 is in planar contact with the guide portions 35 and 36 in the seat belt lock guide holes 21 and 22, the locking-member supporting shaft member 26 is movable in the longitudinal direction of the seat belt lock guide holes 21 and 22 while being guided by the guide portions 35 and 36. At this time, the linear portion 34 in the locking-member supporting shaft member 26 slides on the guide surfaces of the guide portions 35 and 36.

The axial length of the locking-member supporting shaft member 26 is longer than the length between outer side wall surfaces 37 and 38 of the side walls 23 and 24 in the resin mold portion 12. Accordingly, in a state where the seat belt lock 13 is mounted on the resin mold portion 12, the opposite end portions of the locking-member supporting shaft member 26 penetrating through the inner hole 27 in the locking member 25 penetrates through the seat belt lock guide holes 21 and 22 and protrudes outside the opposite side walls 23 and 24. The protruding portions 30 and 31 in the locking member 25 enter the seat belt lock guide holes 21 and 22, respectively, and the substantially half portion of the locking member 25 on the second side is positioned between the inner side wall surfaces 32 and 33 in the opposite side walls 23 and 24 in the resin mold portion 12. When the locking-member supporting shaft member 26 moves while being guided by the seat belt lock guide holes 21 and 22 without rotating, the locking member 25 also moves together with the locking-member supporting shaft member 26 without rotating. In that case, the locking member 25 remains in the above-described state. In this way, the seat belt lock 13 moves linearly while being guided by the seat belt lock guide holes 21 and 22 without rotating.

Figure 6A:
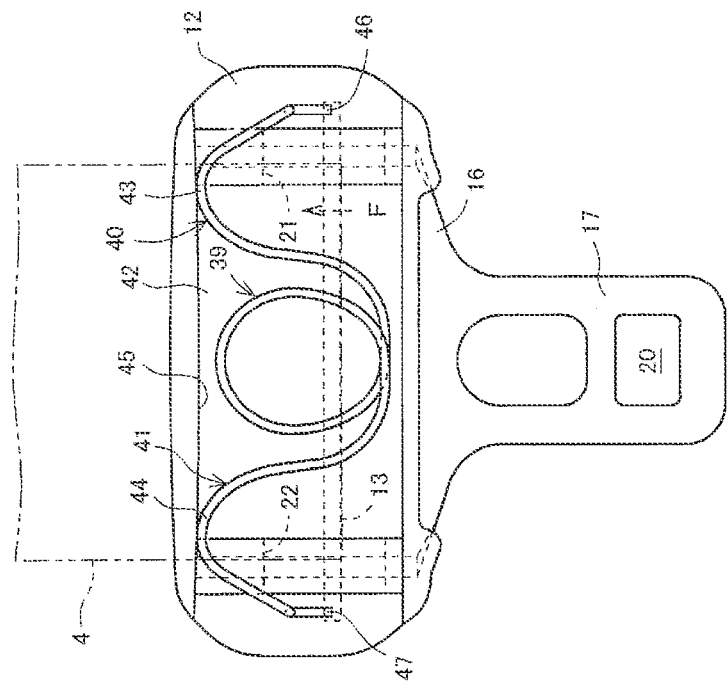
FIG. 6(A) illustrates a state where a torsion spring is inactive.

The torsion spring 14 is composed of a single wire having springiness (elasticity). As illustrated in FIGS. 2 and 6(A), the torsion spring 14 includes a torsion portion 39 of approximately one turn and substantially U-shaped portions (or substantially V-shaped portions) 40 and 41 extending from the opposite ends of the torsion portion 39. In that case, the torsion portion 39 is arranged in a bottom portion 42 between the opposite side walls 23 and 24 in the resin mold portion 12 and on an opposite side to the seat belt lock 13 with respect to the bottom portion 42. The substantially U-shaped portions 40 and 41 extend outside the opposite side walls 23 and 24 in the resin mold portion 12, respectively. The substantially U-shaped portions 40 and 41 include curved portions 43 and 44, respectively, supported on a spring supporting portion 45 in the resin mold portion 12.

Moreover, a pair of locking-member connection portions 46 and 47 are disposed on extended sections of the substantially U-shaped portions 40 and 41, respectively. The locking-member connection portions 46 and 47 are detachably fixed on spring fixing portions 48 and 49 disposed on the opposite end portions of the locking-member supporting shaft member 26 outside the opposite side walls 23 and 24, respectively. The seat belt lock 13 is continuously urged toward the engagement portion 17 in the tongue body 11 by the urging force caused by torsional elastic deformation of the torsion spring 14.

Figure 6B:
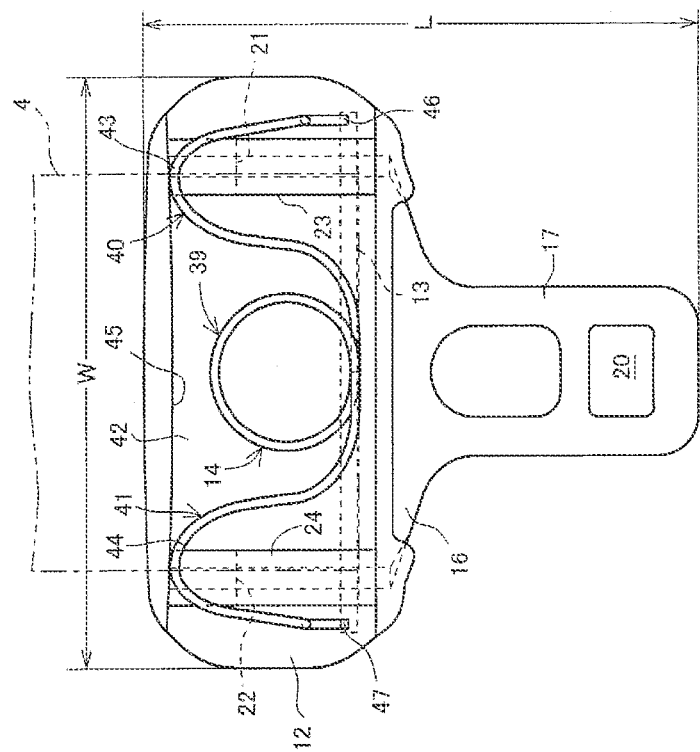
FIG. 6(B) illustrates a state in the course of activating the torsion spring.

When the seat belt lock 13 in the inactive state illustrated in FIG. 6(A) is pressed upward (in a direction where it moves away from the engagement portion 17) by force F, indicated by the arrow, from the seat belt 4 as illustrated in FIG. 6(B), the seat belt lock 13 moves upward while being guided by the seat belt lock guide holes 21 and 22 against the urging force of the torsion spring 14 while torsionally deforming the torsion portion 39 in the torsion spring 14. At this time, of the torsion spring 14, sections other than the torsion portion 39, these sections including the substantially U-shaped portions 40 and 41, are also elastically deformed. The urging force caused by their elastic deformation is large, but this urging force is smaller than the urging force caused by the torsional deformation of the torsion portion 39.

As illustrated in FIG. 2, the cover 15 is made of resin and has a substantially U (rectangular U) shape. As illustrated in FIGS. 3(B) and 4, the cover 15 is detachably attached to the resin mold portion 12 so as to cover the torsion spring 14. The resin mold portion 12 and the cover 15 constitute a gripping portion allowing an occupant to grip it to engage the tongue 7 in the buckle 8.

In the tongue 7 and seat belt device 1 configured in the above-described manner in this example, in a state where the seat belt 4 is not attached, as previously described, the seat belt 4 is fully retracted by the seat belt retractor 3. In the state where the seat belt 4 is not attached, as illustrated in FIG. 4, the seat belt lock 13 is in an unlocking position (position closest to the engagement portion 17 in the tongue body 11) by the urging force of the torsion spring 14.

Figures 7A, 7B:
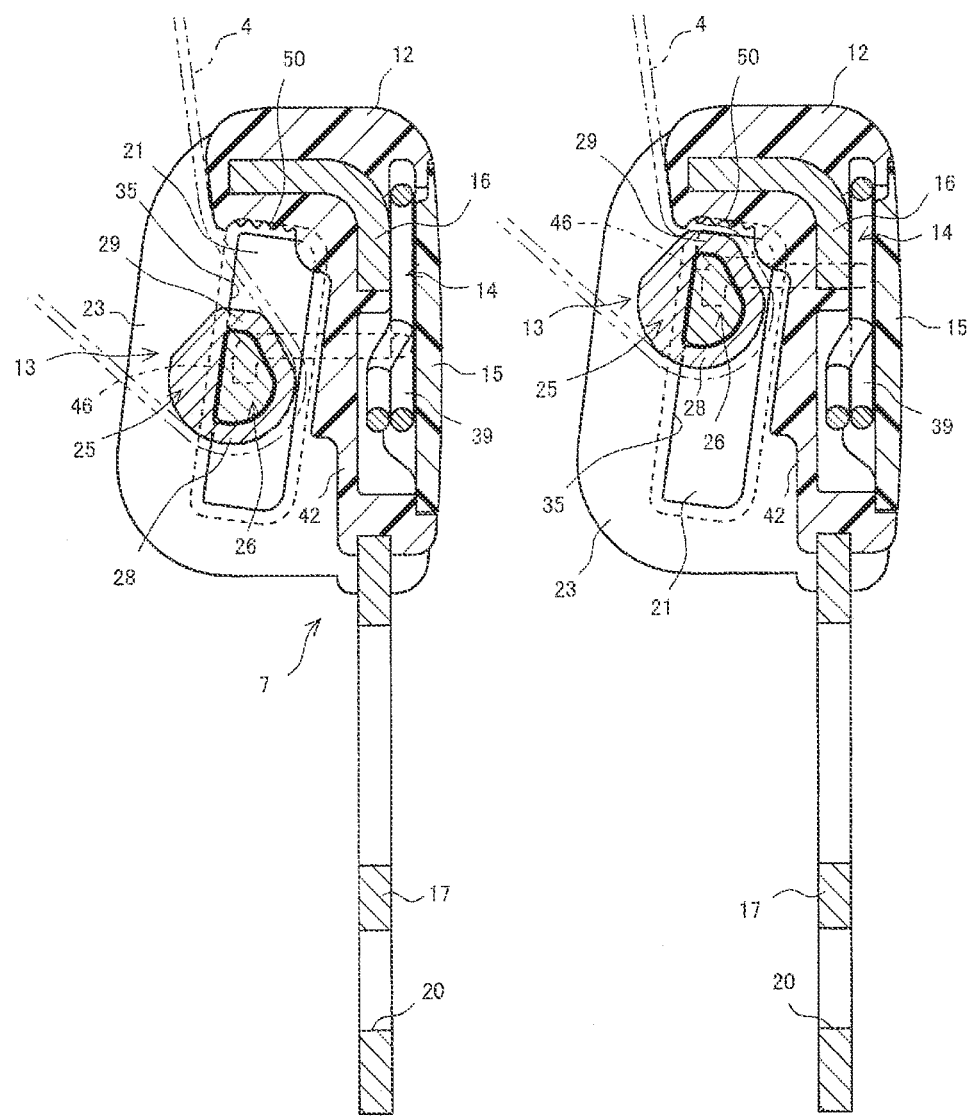
FIG. 7(A) is a cross-sectional view that is similar to FIG. 4 and that illustrates the tongue in a state where the seat belt is attached.
FIG. 7(B) is a cross-sectional view that is similar to FIG. 4 and that illustrates the tongue in an emergency state.

When an occupant pulls the seat belt 4, engages the tongue 7 in the buckle 8, and moves his or her hand off the tongue 7, an excessively retracted section of the seat belt 4 is retracted by the seat belt retractor 3 and the seat belt 4 is attached to the occupant. In a state where the seat belt 4 is attached to the occupant, because the seat belt lock 13 is pressed by the seat belt 4, as illustrated in FIG. 7(A), the seat belt lock 13 is guided by the seat belt lock guide holes 21 and 22 and moved to a position where it is remote from the engagement portion 17 in the tongue body 11 by a predetermined amount. At this time, because the locking-member supporting shaft member 26 slides on the resin-molded inner peripheral guide surface of the seat belt lock guide holes 21 and 22, emission of noise when the locking-member supporting shaft member 26 moves is suppressed.

In this position of the seat belt rock 13, the seat belt lock 13 does not lock the seat belt 4. Accordingly, the lap belt 10 can be extended out relatively smoothly. When the seat belt lock 13 moves and the lap belt 10 is extended out, because the seat-belt pinching reduction portion in the locking member 25 can prevent the seat belt 4 from being pinched, the lap belt can be extended out more smoothly and stably.

In emergency in the state where the seat belt 4 is attached to an occupant, the seat belt retractor 3 locks the withdrawal of the seat belt 4, thereby restraining the occupant by the seat belt 4. At this time, because the lap belt 10 attempts to be extended by the inertial force of the occupant, the seat belt lock 13 is pressed by the seat belt 4 with a large force. Then the seat belt lock 13 largely moves away from the engagement portion 17 in the tongue body 11 and reaches the locking position illustrated in FIG. 7(B).

In this case, because the locking-member supporting shaft member 26 slides on the resin inner peripheral surfaces of the seat belt lock guide holes 21 and 22, emission of noise when the locking-member supporting shaft member 26 is suppressed. Because the seat-belt pinching reduction portion can prevent the seat belt 4 from being pinched when the seat belt lock 13 moves and the lap belt 10 is extended out, the seat belt lock 13 moves more smoothly and stably. In the locking position of the seat belt lock 13 illustrated in FIG. 7(B), the seat-belt locking portion 29 in the seat belt lock 13 pinches the seat belt 4 between the seat-belt locking portion 29 and a seat-belt locking portion 50 in the resin mold portion 12. This locks the extension of the lap belt 10, and the occupant is restrained by the lap belt 10 very effectively.

According to the tongue 7 and the seat belt device 1 configured as described above in this example, the torsion spring 14, which has springiness and is composed of a wire with a relatively small diameter, is used in the seat belt lock urging member configured to urge the seat belt lock 13. Accordingly, thickness T of the torsion portion 39 of approximately one turn in the torsion spring 14 illustrated in FIG. 4 is smaller than that when a traditional coil spring is used. Thus the thickness of the gripping portion in the tongue 7 can be reduced effectively, in comparison with traditional cases.

Because a wire is simply arranged in the urging section achieved by the torsion spring 14 in the seat belt lock 13, it can be thinner than a coil spring. Accordingly, width W of the gripping portion in the tongue 7 illustrated in FIG. 6(A) can be reduced very effectively, in comparison with traditional cases where coil springs are used.

Moreover, the use of the torsion spring 14 in the seat belt lock urging member can reduce the space where the torsion spring 14 is placed in the direction of movement of the seat belt lock 13 in the urging section achieved by the torsion spring 14 in the seat belt lock 13, in comparison with traditional cases where coil springs are used. Accordingly, longitudinal length L of the tongue 7 illustrated in FIG. 6(A) can be reduced very effectively, in comparison with traditional cases where coil springs are used.

In this way, even when the seat belt lock 13 is disposed, the tongue 7 can be compact in size. Thus the ease of handling of the tongue 7 by an occupant can be improved, and satisfactory ease of attaching the seat belt 4 is obtainable.

Moreover, the use of the single torsion spring 14 can reduce the number of parts, in comparison with traditional cases where two coil springs are used. Thus the mountability of the tongue 7 can be more improved.

Moreover, the seat belt lock 13 includes two members consisting of the locking member 25 and the locking-member supporting shaft member 26. Thus only the shape of the locking-member supporting shaft member 26 as seen from the side (transverse sectional shape) can be small, and when the opposite end portions of the locking-member supporting shaft member 26 penetrate through the seat belt lock guide holes 21 and 22, the width of each of the seat belt lock guide holes 21 and 22 can be small. Accordingly, because the tongue 7 can be more compact. In addition, the shape of the locking member 25 as seen from the side (transverse sectional shape) can be relatively large, and the locking member 25 can lock the seat belt 4 with stability.

Moreover, when the seat belt lock 13 moves, the locking-member supporting shaft member 26 slides on the resin-molded inner peripheral surfaces of the seat belt lock guide holes 21 and 22. Thus emission of operating noise when the locking-member supporting shaft member 26 moves can be suppressed.

Moreover, the locking member 25 in the seat belt lock 13 includes the seat-belt pinching reduction portion. Thus the possibility that the seat belt 4 is pinched between the opposite ends of the locking member 25 and the inner side wall surfaces 32 and 33 of the opposite side walls 23 and 24 in the resin mold portion 12 can be reduced.

In the above-described example, the inner peripheral surfaces of the seat belt lock guide base holes 18 and 19 in the gripping base 16 are fully resin-molded. In the present invention, it is merely required that, of the seat belt lock guide base holes 18 and 19, at least the sliding portion on which the locking-member supporting shaft member 26 slides be resin-molded.

In the present invention, when the seat belt lock 13 is urged by the torsion spring 14, the resin mold portion 12 is optional. However, in order to have more satisfactory operability of the gripping portion of the tongue 7, it may be preferable that the resin mold portion 12 be included.

Moreover, the seat belt lock 13 can also be composed of a single member. However, in order to make the tongue 7 more compact, it may be preferable that the seat belt lock 13 include two members, as in the above-described example. In sum, various design changes can be made in the tongue in the present invention within the technical scope of the claims.

Moreover, even if the torsion spring 14, which is configured to urge the seat belt lock 13 and is included in the tongue in the present invention described in the claims, is not used, the above-described object and operational advantages in the present invention can be accomplished. That is, the tongue can be compact in size even when the locking member is disposed, satisfactory mountability can be obtained, and emission of operating noise can be effectively suppressed. When the spring is not used, because the seat belt lock 13 in a free state would rattle in normal conditions, a structure may be preferable in which in the normal conditions the seat belt lock 13 be fixed to the seat belt lock 13 and maintained by maintaining means, such as a shear pin, and in emergency the seat belt lock 13 be activated by weakening or eliminating the maintaining force in which the maintaining means maintains the seat belt lock 13 by breaking the shear pin or the like.

INDUSTRIAL APPLICABILITY

In a seat belt device installed in a vehicle, such as an automobile, and restraining an occupant by a seat belt, the tongue and the seat belt device according to the present invention can be suitably applicable to a tongue slidably supported on a seat belt and engaged in a buckle and a seat belt device including the same.

REFERENCE SIGNS LIST

1 seat belt device, 3 seat belt retractor, 4 seat belt, 7 tongue, 8 buckle, 9 shoulder belt, 10 lap belt, 11 tongue body, 12 resin mold portion, 13 seat belt lock, 14 torsion spring, 15 cover, 16 gripping base, 17 engagement portion, 20 engagement hole, 21, 22 seat belt lock guide holes, 23, 24 side walls, 25 locking member, 26 locking-member supporting shaft member, 27 inner hole, 28 seat belt winding portion, 29 seat-belt locking portion, 30, 31 protruding portions, 32, 33 inner side wall surfaces, 34 linear portion, 35, 36 guide portions, 37, 38 outer side wall surfaces, 39 torsion portion, 40, 41 substantially U-shaped portions (substantially V-shaped portions), 42 bottom portion, 45 spring supporting portion, 46, 47 locking-member connection portions, 48, 49 spring fixing portions, 50 seat-belt locking portion.

The invention claimed is:

1. A tongue slidably supported on a seat belt, the tongue being engageable in a buckle, the tongue comprising:
   a tongue body including a gripping base and an engagement portion, the gripping base having a guide hole, the engagement portion being engageable in the buckle;
   a resin mold portion on the gripping base in the tongue body;
   a seat-belt locking member around which the seat belt is wound, the seat-belt locking member being movable between an unlocking position where the seat-belt locking member does not lock the seat belt and a locking position where the seat-belt locking member locks the seat belt while being guided by the guide hole, the seat-belt locking member being set in the unlocking position under normal conditions and being set in the locking position in emergency; and
   a torsion spring configured to continuously urge the seat-belt locking member to the unlocking position,
   wherein in the emergency, the seat-belt locking member is set in the locking position by a pressing force from the seat belt,
   wherein the guide hole has a guide surface allowing the seat-belt locking member to slide thereon, and at least the guide surface is made of resin.

2. The tongue according to claim 1, wherein the torsion spring comprises a single wire having springiness.

3. The tongue according to claim 2, wherein the torsion spring includes at least a torsion portion and a pair of locking-member connection portions, the torsion portion is made of one turn of the wire and is torsionally deformable, and the pair of locking-member connection portions are connected to opposite end portions of the seat-belt locking member, respectively.

4. A seat belt device comprising at least the seat belt; a seat belt retractor configured to retract the seat belt; the tongue slidably supported on the seat belt; and the buckle allowing the tongue to be engaged therein, the seat belt device being attached to an occupant by engagement of the tongue into the buckle,
   wherein the tongue comprises the tongue according to claim 1.

5. A tongue slidably supported on a seat belt, the tongue being engageable in a buckle, the tongue comprising:
   a tongue body including a gripping base and an engagement portion, the gripping base having a linear guide hole, the engagement portion being engageable in the buckle;
   a resin mold portion on the gripping base in the tongue body;
   a seat-belt locking member around which the seat belt is wound, the seat-belt locking member being only linearly movable between an unlocking position where the seat-belt locking member does not lock the seat belt and a locking position where the seat-belt locking member locks the seat belt while being guided by the linear guide hole, the seat-belt locking member being set in the unlocking position under normal conditions and being set in the locking position in emergency; and
   a torsion spring configured to continuously urge the seat-belt locking member to the unlocking position,
   wherein the seat-belt locking member includes a tubular locking member around which the seat belt is wound and a locking-member supporting shaft member, the tubular locking member being configured to lock the seat belt, the locking-member supporting shaft member penetrating through an inner hole of the seat-belt locking member, supporting the tubular locking member while disabling relative rotation thereof, and penetrating through the linear guide hole and only linearly sliding in the linear guide hole, the locking-member supporting shaft member is urged by the torsion spring, and in the emergency, the seat-belt locking member is set in the locking position by a pressing force from the seat belt.

6. A tongue slidably supported on a seat belt, the tongue being engageable in a buckle, the tongue comprising:

a tongue body including a gripping base and an engagement portion, the gripping base having a linear guide hole, the engagement portion being engageable in the buckle;

a resin mold portion on the gripping base in the tongue body;

a seat-belt locking member around which the seat belt is wound, the seat-belt locking member being only linearly movable between an unlocking position where the seat-belt locking member does not lock the seat belt and a locking position where the seat-belt locking member locks the seat belt while being guided by the linear guide hole, the seat-belt locking member being set in the unlocking position under normal conditions and being set in the locking position in emergency; and a torsion spring configured to continuously urge the seat-belt locking member to the unlocking position, wherein the seat-belt locking member includes a tubular locking member around which the seat belt is wound and a locking-member supporting shaft member, the tubular locking member being configured to lock the seat belt, the locking-member supporting shaft member penetrating through an inner hole of the tubular locking member, supporting the tubular locking member while disabling relative rotation thereof, and penetrating through the linear guide hole and only linearly sliding in the linear guide hole, the tubular locking member includes a seat-belt pinching reduction portion configured to reduce a possibility that the seat belt is pinched, the locking-member supporting shaft member is urged by the torsion spring, and in the emergency, the seat-belt locking member is set in the locking position by a pressing force from the seat belt.

* * * * *